Aug. 9, 1938.   L. W. EGGLESTON   2,126,625
APPARATUS FOR CONDITIONING MILK OR OTHER LIQUIDS
Filed Oct. 30, 1934

INVENTOR
Lewis W. Eggleston
BY
his ATTORNEY

Patented Aug. 9, 1938

2,126,625

UNITED STATES PATENT OFFICE 2,126,625

APPARATUS FOR CONDITIONING MILK OR OTHER LIQUIDS

Lewis W. Eggleston, Detroit, Mich., assignor to Detroit Lubricator Company, Detroit, Mich., a corporation of Michigan Application October 30, 1934, Serial No. 750,702

13 Claims. (Cl. 31—4)

This invention relates to apparatus for conditioning and refrigerating liquids and has for its primary object the provision of means for cooling and aerating milk preparatory to its being marketed.

Another object of the invention is the provision of means for removing the animal heat and noxious odors from freshly produced milk, and further to so condition the milk as to minimize the possibilities of early bacteriological deterioration.

Heretofore it has been the practice of those handling milk to subject it to one of the following processes:

First—That of placing the loaded milk can in cold water and manually agitating the milk until its temperature is reduced to between 50 and 60 degrees, or Second—That of allowing the milk to flow over water cooled pipes.

The first named process is objectionable because it is necessary to continuously keep the water cool by some external means of refrigeration. The second process is objectionable for the reason that the milk is exposed to the germ laden atmosphere and may be subject to the possibility of inclusion of foreign substances.

Other means have been devised for the purpose of initially refrigerating milk but they have proved commercially unsuccessful because of their expense, or because they were too complicated to be readily adaptable to the practices of the multitude of rural milk producers.

In order to obviate the foregoing difficulties and to accomplish the results hereinabove mentioned, I have devised and herein describe a simple apparatus wherein I employ the principle of refrigerating by creating a partial and controllable vacuum over the liquid to be cooled. In the accompanying drawing which forms a part of the within disclosure:

Figures 1, 2:
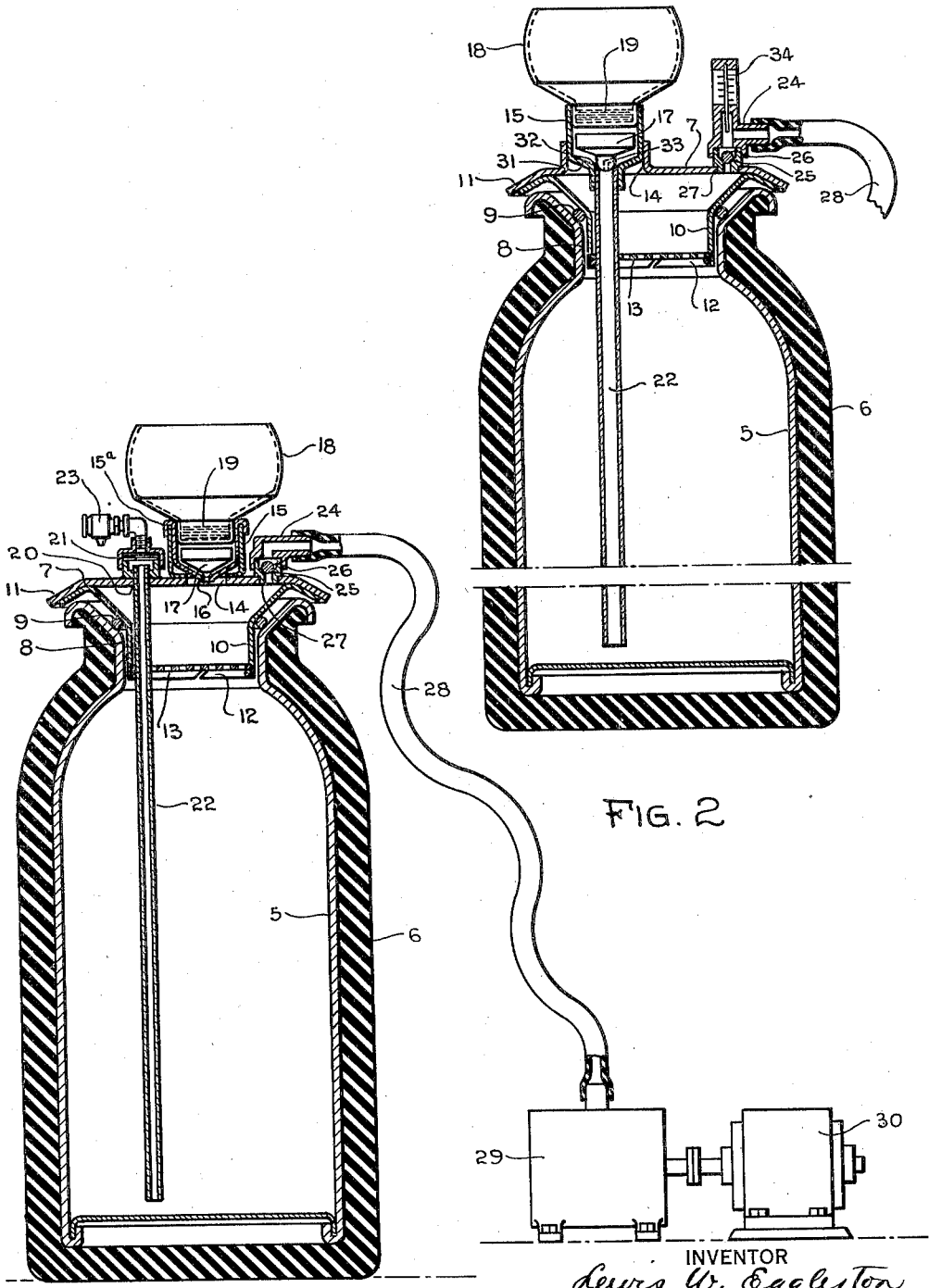
Fig. 1 is a vertical sectional view of a device embodying one form of my invention.
Fig. 2 is a view, in section, of a modified form of my apparatus.

In practice I prefer to use a metallic container 5 of conventional size and contour defining a liquid-receiving chamber, to which is applied, by any suitable means, a coating 6 of rubber or other substance which acts as a heat insulator and sound deadener and serves as a protection to the exterior of the container when in transit.

I provide a suitable hollow cover 7, which serves as a closure for the container 5 and a mounting means for the elements, hereinafter described, which are combined with others to form my invention. An air tight seal is maintained between the cover 7 and the throat 8 of the container 5, by means of a gasket 9, which may be made of any suitable resilient non-porous material.

The cover 7 is preferably stamped with sidewalls 10 conforming to the contour of the throat 8, and is provided with an overhanging top member 11, which is air tightly secured to the sidewalls 10 by welding, "sweating" or similar means. Disposed within the lower part and closing the underside of the cover 7, and held in place by a split ring 12, or other suitable means, is an apertured or perforate member 13 such as a screen or grid, the purpose of which will be explained hereinafter.

Superimposed on the member 11, and air tightly secured thereto about an aperture 14 formed therein, is an upward extending funnel holder or hollow liquid-receiving member 15. The member 15 preferably has a substantially conical or inward and downward sloping internal bottom wall which may be provided by a liner or insert member 15a. At the lowermost point or in the apex of the bottom wall there is an outlet port establishing communication between the interior of member 15 and its liner 15a and the interior of the container chamber and which provides a valve seat 16 at the port orifice. Within the insert member 15a is a float valve 17, which is provided with a head or face designed to engage the valve seat 16, to control the aforesaid port and prevent the admission of air through the aperture 14 during the refrigerating process. A large capacity funnel 18, provided with a liquid filtering means 19 which overlies valve 17 is arranged to rest, by its own weight, on and preferably in the holder 15. The filtering means 19 is removably secured in and across the lower end of funnel 18 within holder 15 and consists of a plurality of layers of porous material and may be readily removed and cleaned. In certain applications it might be desirable to support the filtering means 19 by means of a shoulder in the lining of the funnel holder or member 15, all of which is within the contemplation of the invention.

Extending through an aperture 20 formed in the top member 11, and secured thereto by a suitable fitting 21, is a bleeder tube 22, which extends through the apertured member 13 to a point below the liquid level in the container chamber and which preferably terminates near the bottom of the container 5. The fitting 21 is provided with a cock 23, which comprises a regulating means for controlling the rate of admission of air to the tube 22 and serves as a means for opening and closing the passageway through the said tube. A second fitting 24, having a valve seat 25 and a ball valve 26, is mounted in an aperture 27, also formed in the top member 11, and communicates, through a tube 28, with a suction pump 29, which is power driven by an electric motor 30 or any other suitable means. The ball valve 26 closes the suction line against back pressure and prevents the admission of air to the container through said line.

To use the apparatus the container 5 is positioned at a place convenient to the milker. The assembled unit is then placed in position in the throat of the container so that the container is tightly sealed. Connection is then made to the air pump by a suitable length of hose. As milk is produced it is poured into the funnel 18 and is allowed to pass through the filter 19 into the funnel holder 15. As the liquid level in the holder 15 rises it lifts the float valve 17 and allows the milk to flow through the port comprising the valve seat 16 and thence through the apertured member 13, into the container 5. When the desired amount of milk is in the can the pump is started and the air is removed from over the liquid contents, thereby causing a partial vacuum in the container. As the pressure above the liquid is reduced an active evaporation of the water from the milk takes place. The evaporation causes a loss of heat, with a resulting lowering of temperature of the milk. An automatic refrigeration of the milk is thereby effected.

I have found that during the operations just described it is highly desirable to introduce a small amount of air to the liquid. This introduction of air is made near the bottom of the container 5 through the tube 22 and the cock 23. As the air is introduced near the bottom of the container it must rise through the liquid. As it passes upwardly through the milk it carries with it the animal heat and noxious odors and thoroughly aerates the milk.

The apertured member 13 hereinabove referred to, serves to intercept moisture entrained with the withdrawn air and to arrest the upward travel of the milk bubbles, and breaking them, causes the milk to return to the container and prevents it from being carried over into the suction line 28.

By this method of cooling, the milk is given a higher cream content, inasmuch as some of the water vapor is removed from it during the evaporation process. If it should be desired to have the cream content remain unchanged, a sufficient amount of water can be added before the cooling operation is commenced to offset the amount of water removed by evaporation.

After the milk is cooled to the required temperature and the desired conditions are obtained within the container, an insulated, but otherwise conventional, cover is placed on the container and it is ready for shipment.

I have found that with this apparatus and by this process a greatly superior product can be obtained and it is my belief that milk prepared in this manner will have such a low bacteria count that it will obviate the necessity of pasteurizing it, with the result that the milk will retain its original flavor, and at the same time be safeguarded against carrying such diseases as undulant or Malta fever and the like.

It is within the contemplation of my invention that certain modifications can be made in the arrangement of the elements comprising my device. For example in Fig. 2 I illustrate a modified form in which, for the sake of brevity, the principal elements are designated with the same reference characters as in Fig. 1. In the modified form the tube 22 serves both as the liquid and air intake, and is secured directly to the lower part of the funnel holder 15, which in this instance is formed with inwardly and downwardly sloping, substantially conical, sidewalls 31, designed to carry all particles of milk into the tube 22, so that none of the milk may remain thereon to become sour. This form of arrangement is also very easily cleaned. In this modification there is provided at the top of the tube 22 a valve seat 32 cooperable with the float valve 17 controlling the entrance to tube 22 and having a by-pass passageway 33 opening therethrough which comprises a small orifice for the bleeding of a limited quantity of air into the tube 22 and the chamber of the container 5 from the liquid-receiving member 15. I also illustrate in Fig. 2 the use of a thermometer element 34 as an integral part of the air exhaust fitting 24, so that the temperature within the container is ascertainable at all times while the device is in use.

Having described my invention, what I claim and desire to secure by United States Letters Patent is:

1. A device of the character described comprising the combination of a receptacle having a chamber, a cover for said receptacle, a hollow liquid-receiving member carried by said cover and having a port communicating with said chamber, a float valve controlling said port, said cover having an outlet communicating with said chamber independently of said port, a liquid filtering means carried by said liquid-receiving member and overlying said float valve, and means associated with said cover outlet for exhausting air from said receptacle.

2. A device of the character described comprising the combination of a receptacle having a chamber, a cover for said receptacle having an aperture therethrough, a hollow liquid-receiving member carried by said cover and communicating with said chamber through said aperture, a float valve cooperable with said aperture and positioned within said liquid-receiving member, liquid filtering means supported within said liquid-receiving member and overlying said float valve, said cover having an outlet communicating with said chamber independently of said aperture, and means associated with said cover outlet for exhausting air from said chamber.

3. A device of the character described comprising the combination of a receptacle having a chamber, a cover for said receptacle having an aperture therethrough, a hollow liquid-receiving member carried by said cover and communicating with said chamber through said aperture, said liquid-receiving member having an inwardly and downwardly sloping internal bottom wall whereby to eliminate retention of liquid thereby, a float valve operable upon admission of liquid to said liquid-receiving member to open said aperture, conduit means extending to a point below the liquid level in said chamber, means to bleed air past said float valve and communicating with said conduit means whereby to admit air to said chamber when said valve is closed, and means associated with said cover for exhausting air from said receptacle.

4. A device of the character described comprising the combination of a receptacle having a chamber, a cover for said receptacle having an aperture therethrough, a hollow liquid-receiving member carried by said cover and communicating with said chamber through said aperture, a float valve controlling liquid flow through said aperture, said float valve having an air bleed opening into said chamber, and means associated with said cover for exhausting air from said receptacle, said air exhausting means tending on operation to close said valve.

5. A device of the character described comprising the combination of a receptacle having a chamber, a cover for said receptacle having an aperture therethrough, a hollow liquid-receiving member carried by said cover and communicating with said chamber through said aperture, a tube having a longitudinal passageway and depending from said cover at said aperture into said chamber, said tube serving to admit liquid to and as an air intake for said receptacle, a float valve for closing said passageway, means operable when said valve is closed to by-pass air to said passageway, and means associated with said cover for exhausting air from said receptacle.

6. A device of the character described comprising the combination of a receptacle having a chamber, a cover for said receptacle having an aperture therethrough, a hollow liquid-receiving member extending upward from said cover and communicating with said chamber through said aperture, a tube depending from said cover at said aperture and terminating adjacent the bottom of said chamber, a float valve for closing the passageway through said tube, liquid filtering means overlying said float valve, a funnel member mounted on and discharging into said liquid-receiving member, and means associated with said cover for exhausting air from said receptacle.

7. A device of the character described comprising the combination of a receptacle having a chamber, a cover for said receptacle having an aperture therethrough, a hollow liquid-receiving member extending upward from said cover and communicating with said chamber through said aperture, a float valve positioned in said liquid-receiving member and controlling flow through said aperture, a funnel member carried by and discharging into said liquid-receiving member, liquid filtering means positioned within said funnel member and overlying said float valve, said cover having an outlet communicating with said chamber independently of said aperture, and means associated with said cover outlet for exhausting air from said receptacle.

8. A device of the character described comprising the combination of a receptacle having a chamber, a hollow cover for said receptacle and having an aperture therethrough, said cover having a top and depending side walls, a perforate member carried by said side walls and closing the underside of said cover, a hollow liquid-receiving member carried by said cover and communicating with said chamber through said aperture, a float valve cooperable with said aperture and carried by said cover, liquid filtering means carried by said cover and overlying said float valve, and means associated with said cover for exhausting air from said chamber, said perforate member being interposed between said exhausting means and said chamber whereby to intercept entrained moisture in the exhausted air.

9. A device of the character described comprising the combination of a receptacle having a chamber, a hollow cover for said receptacle and having an aperture therethrough, said cover having a top and depending side walls, a perforate member carried by said side walls and closing the underside of said cover, a hollow liquid-receiving member carried by said cover and communicating with said chamber through said aperture, means controlling flow from said liquid-receiving member into said chamber, and means associated with said cover for exahusting air from said chamber, said perforate member being interposed between said exhausting means and said chamber whereby to intercept entrained moisture in the exhausted air.

10. A device of the character described comprising the combination of a receptacle having a chamber, a hollow cover for said receptacle and having an aperture therethrough, said cover having a top and depending side walls, a perforate member carried by said side walls and closing the underside of said cover, a hollow liquid-receiving member carried by said cover and communicating with said chamber through said aperture, means controlling flow from said liquid-receiving member into said chamber, liquid filtering means for said aperture, and means associated with said cover for exhausting air from said chamber, said perforate member being interposed between said exhausting means and said chamber whereby to intercept entrained moisture in the exhausted air.

11. An apparatus for cooling and aerating liquid comprising a receptacle having a chamber, a cover for closing said chamber, said cover having an inlet and having an outlet spaced from said inlet, means communicating with said outlet and operable to withdraw air from said chamber, a liquid-receiving member mounted on said cover and communicating with said inlet, a float valve in said liquid-receiving member and operable to close said inlet so that operation of said air withdrawing means will create a vacuum in said chamber and tend to close said valve, and means to bleed air into said chamber below the liquid level therein.

12. An apparatus for cooling and aerating liquid comprising a receptacle having a chamber, a cover for closing said chamber, said cover having an inlet and having an outlet spaced from said inlet, means communicating with said outlet and operable to withdraw air from said chamber, a liquid-receiving member mounted on said cover and communicating with said inlet, a float valve in said liquid-receiving member and operable to close said inlet so that operation of said air withdrawing means will create a vacuum in said chamber and tend to close said valve, means to bleed air into said chamber below the liquid level therein, and means interposed between said chamber and said outlet to intercept moisture entrained with the withdrawn air.

13. In an apparatus of the character described, a container having an open neck, a cover member having a substantially flat top wall and a downward extending side wall conforming to and substantially fitting within said neck, a hollow upward extending projection on said top wall, said top wall having an inlet aperture therethrough establishing communication between said container and the interior of said projection, a funnel member removably supported in said projection, filtering means carried by said funnel member and removable therewith, a float valve positioned in said projection and operable to close said inlet aperture, said top wall having an outlet aperture positioned laterally of said inlet aperture, and a check valve closing said outlet aperture against flow therethrough into said container.

LEWIS W. EGGLESTON.